US012431092B2

(12) United States Patent
Yoon et al.

(10) Patent No.: US 12,431,092 B2
(45) Date of Patent: *Sep. 30, 2025

(54) DISPLAY APPARATUS HAVING AN INITIAL PERIOD WITH MULTIPLE REFRESHES AND METHOD THEREOF

(71) Applicant: LG DISPLAY CO., LTD., Seoul (KR)

(72) Inventors: Sanghun Yoon, Seoul (KR); Kyeongtaek Min, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,332

(22) Filed: Jan. 12, 2024

(65) Prior Publication Data

US 2024/0153464 A1 May 9, 2024

Related U.S. Application Data

(63) Continuation of application No. 17/970,441, filed on Oct. 20, 2022, now Pat. No. 11,908,421.

(30) Foreign Application Priority Data

Dec. 20, 2021 (KR) ........................ 10-2021-0182415

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/08* (2013.01)

(58) Field of Classification Search
CPC .................................................... G09G 3/3275
USPC ........................................................... 345/204
See application file for complete search history.

(56) References Cited

U.S. PATENT DOCUMENTS

| | | | |
|---|---|---|---|
| 9,607,562 B2 | 3/2017 | Kim et al. |
| 11,100,863 B2 | 8/2021 | Park et al. |
| 11,810,513 B2 | 11/2023 | Park et al. |
| 2015/0193062 A1 | 7/2015 | Wyatt |

(Continued)

FOREIGN PATENT DOCUMENTS

| | | |
|---|---|---|
| KR | 10-2016-0015451 A | 2/2016 |
| KR | 10-2018-0011397 A | 2/2018 |

(Continued)

OTHER PUBLICATIONS

Office Action issued on Jan. 3, 2025 in Korean Patent Application No. 10-2021-0182415.

(Continued)

*Primary Examiner* — Long D Pham
(74) *Attorney, Agent, or Firm* — Morgan, Lewis & Bockius LLP

(57) ABSTRACT

Disclosed are a display apparatus capable of changing a refresh period to improve response characteristics under a low-speed operation mode, and a method for operating the apparatus. The display apparatus includes a display panel; and a panel driving circuit configured to drive the display panel, wherein in a low-speed operation mode, the apparatus is configured to control the panel driving circuit to: perform multiple refreshes during an initial period of the first frame; and, after the multiple refreshes, change a refresh period and perform refreshes based on the changed refresh period.

11 Claims, 7 Drawing Sheets

(56) References Cited

U.S. PATENT DOCUMENTS

| | | | | |
|---|---|---|---|---|
| 2015/0248873 | A1* | 9/2015 | Tanaka | G09G 3/3648 345/99 |
| 2019/0035337 | A1 | 1/2019 | Kato | |
| 2021/0118378 | A1 | 4/2021 | Son et al. | |
| 2024/0153464 | A1* | 5/2024 | Yoon | G09G 3/3225 |

FOREIGN PATENT DOCUMENTS

| | | | |
|---|---|---|---|
| KR | 10-2020-0088545 | A | 7/2020 |
| KR | 10-2021-0045805 | A | 4/2021 |
| KR | 10-2021-0082865 | A | 7/2021 |

OTHER PUBLICATIONS

Notice of Allowance issued on Jun. 2, 2025 in Korean Patent Application No. 10-2021-0182415 with partial English translation.

* cited by examiner

DISPLAY APPARATUS HAVING AN INITIAL PERIOD WITH MULTIPLE REFRESHES AND METHOD THEREOF

CROSS-REFERENCE TO RELATED APPLICATIONS

This application is a continuation of U.S. patent application Ser. No. 17/970,441, filed on Oct. 20, 2022, which claims priority from Korean Patent Application No. 10-2021-0182415 filed on Dec. 20, 2021 in the Korean Intellectual Property Office and all the benefits accruing therefrom under 35 U.S.C. 119, and the contents of each of the aforementioned applications in its entirety are herein incorporated by reference.

BACKGROUND

Technical Field

The present disclosure relates to a display apparatus, and more particularly, to a display apparatus capable of changing a refresh period to improve response characteristics in low-speed operation, and a method for operating the display apparatus.

Discussion of the Related Art

As the information society develops, demand for display apparatuses to display images is increasing in various forms. Thus, various types of display apparatuses such as liquid crystal display apparatuses and organic light-emitting display apparatuses are being used. Among the above display apparatuses, the organic light-emitting display apparatus has been on the spotlight due to fast response speed, excellent luminous efficiency, large viewing-angle, and excellent color reproducibility thereof.

In the organic light-emitting display apparatus, pixels respectively including organic light-emitting diodes (OLEDs) are arranged in a matrix form, and luminance of the pixels is adjusted based on a gray level of image data. Each of the pixels includes a driving TFT (Thin Film Transistor) that controls drive current flowing through the OLED based on a gate-source voltage, and at least one switch TFT for programming the gate-source voltage of the driving TFT. The display apparatus adjusts display gray level (luminance) based on an amount of light emitted from the OLED which is proportional to the drive current.

SUMMARY

The organic light-emitting display apparatus drives the pixels at low-speed to reduce power consumption when change in an input image is small.

However, the organic light-emitting display apparatus has a problem in that a refresh period of image data is large in the low-speed operation, so that the image data charged in the pixels does not maintains a target level and leaks.

Further, the organic light-emitting display apparatus has a problem in that response delay occurs due to hysteresis characteristic of the driving TFT in the low-speed operation.

Accordingly, the inventors of the present disclosure have invented a display apparatus capable of improving image quality and response characteristics in low-speed operation and a method for operating the apparatus.

Accordingly, embodiments of the present disclosure are directed to a display apparatus and a method for operating the same that substantially obviates one or more of the problems due to limitations and disadvantages of the related art.

An aspect of the present disclosure is to provide a display apparatus capable of changing a refresh period to improve response characteristics in low-speed operation and a method for operating the apparatus.

Further, another aspect of the present disclosure is to provide a display apparatus capable of maintaining a target level of image data charged to pixels to improve image quality in low-speed operation, and a method for operating the apparatus.

Additional features and aspects will be set forth in part in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus may comprise a display panel; and a panel driving circuit configured to drive the display panel, wherein in a low-speed operation mode, the apparatus is configured to control the panel driving circuit to: perform multiple refreshes during an initial period of the first frame; and after the multiple refreshes, change a refresh period and perform refreshes based on the changed refresh period.

In another aspect, a display apparatus may comprise a display panel; a source driver configured to drive a data line of the display panel; a gate driver configured to drive a gate line of the display panel; and a timing controller configured to control the source driver and the gate driver such that in a low-speed operation mode, multiple refreshes are performed during an initial period of a first frame, and, after performing the multiple refreshes, a refresh period is changed and refresh is performed based on the changed refresh period.

In another aspect, a method for operating a display apparatus may comprise: under a low-speed operation mode, performing multiple refreshes during an initial period of a first frame; performing refresh at an interval of a first period during a remaining period of the first frame; and performing refresh at an interval of a second period greater than the first period during a second frame.

According to some embodiments of the present disclosure, it is possible to change the refresh period to improve response characteristics in the low-speed operation mode.

Further, according to some embodiments of the present disclosure, it is possible to maintain a target level of image data charged to the pixels in the low-speed operation mode.

Further, according to some embodiments of the present disclosure, it is possible to operate at a short period even when change in operation characteristics due to element hysteresis occurs, thereby reducing the change amount such that change in luminance may be reduced and thus the target level may be maintained.

Further, according to some embodiments of the present disclosure, it is possible to improve response characteristics and maintain the target level, thereby improving image quality, under the low-speed operation mode.

Further, according to some embodiments of the present disclosure, it is possible to achieve the low-speed operation while maintaining the image quality, thereby reducing power consumption.

Effects of the present disclosure are not limited to the above-mentioned effects, and other effects as not mentioned will be clearly understood by those skilled in the art from following descriptions.

The purposes, solutions, and effects of the disclosure as described above does not specify essential features of claims. Thus, the scope of claims is not limited by the purposes, solutions, and effects of the disclosure as described above.

It is to be understood that both the foregoing general description and the following detailed description of the present disclosure are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
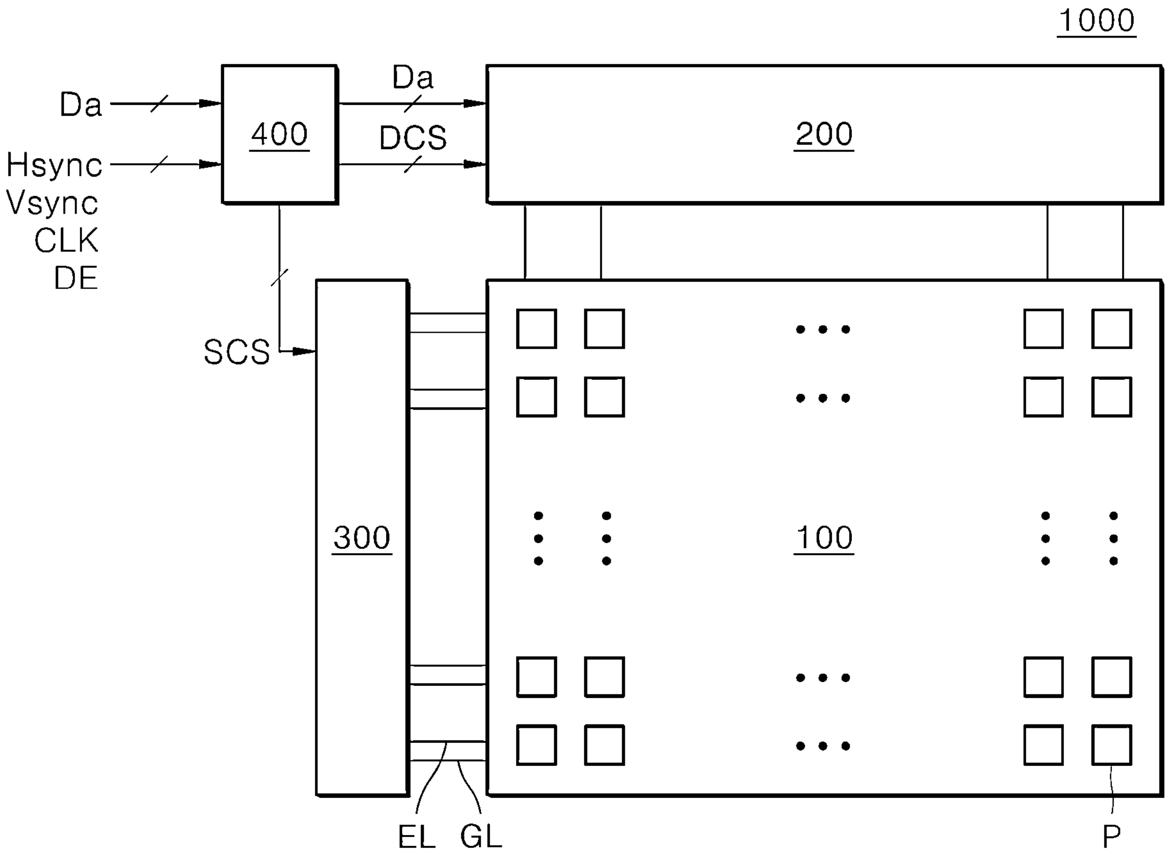
FIG. 1 is a block diagram schematically showing a display apparatus according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

The shapes, sizes, ratios, angles, numbers, and the like disclosed in the drawings for describing embodiments of the present disclosure are merely examples, and thus, the present disclosure is not limited to the illustrated details. Like reference numerals refer to like elements throughout. IN the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

In describing a position relationship, for example, when a position relation between two parts is described as, for example, "on," "over," "under," and "next," one or more other parts may be disposed between the two parts unless a more limiting term, such as "just" or "direct(ly)" is used.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is “connected,” “coupled,” or “adhered” to another element or layer, the element or layer can not only be directly connected or adhered to another element or layer, but also be indirectly connected or adhered to another element or layer with one or more intervening elements or layers “disposed,” or “interposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

A size and a thickness of each component illustrated in the drawing are illustrated for convenience of description, and the present disclosure is not limited to the size and the thickness of the component illustrated.

In description of a signal flow relationship, when a signal is transmitted, for example, ‘from a node A to a node B’, the signal may be transmitted from the node A to the node B via another node unless a term such as ‘immediately’ or ‘directly’ is used.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to accompanying drawings. For convenience of description, a scale of each of elements illustrated in the accompanying drawings differs from a real scale, and thus, is not limited to a scale illustrated in the drawings.

Hereinafter, a display apparatus capable of changing a refresh period to improve response characteristics in low-speed operation and a method for operating the same are disclosed.

Before describing a display apparatus according to an embodiment of the present disclosure and a method for operating the same, meanings of terms as used herein are defined.

As used herein, the low-speed operation may be defined as an operation in which a display panel operates at an operating frequency of 1 Hz. However, the operating frequency in the low-speed operation is not limited to 1 Hz.

As used herein, a phrase “refresh operation” may be defined as an operation of writing a data voltage corresponding to the same image data to a pixel of a display panel in the low-speed operation.

As used herein, the term “multiple refresh” may be defined as an operation of repeatedly writing a data voltage corresponding to the same image data to a pixel of a display panel.

FIG. 1 is a block diagram schematically showing a display apparatus according to an embodiment of the present disclosure.

With reference to FIG. 1, a display apparatus 1000 in accordance with one embodiment of the present disclosure may include a display panel 100 including pixels P, a panel driving circuit that drives signal lines connected to the pixels P, and a timing controller 400 that controls the panel driving circuit.

The panel driving circuit may write image data to the pixels P of the display panel 100. The panel driving circuit may include a source driver 200 that drives a data line connected to the pixels P and a gate driver 300 that drives a gate line GL and an emission line EL connected to the pixels P.

The panel driving circuit may be operated in a low-speed operation mode. The low-speed operation mode may be activated when it is determined based on analysis of an input image that the input image does not change for a preset number of frames, that is, a still image is input for a certain time duration or greater. In the low-speed operation mode, the operating frequency that drives the panel driving circuit is lowered such that a writing period of the image data to the pixel is enlongated to reduce power consumption.

In the low-speed operation mode, a refresh rate at which the image data is updated in the display panel 100 may be lower than that in a default operation mode. For example, when the operating frequency is 60 Hz in the default operation mode, the operating frequency may be 1 Hz in the low-speed operation mode.

The activation of the low-speed operation mode is not limited to a case when the still image is input. For example, the panel driving circuit may be operated in the low-speed operation mode when the display apparatus 1000 operates in a standby mode or when a user command or the input image is not input to the panel driving circuit for a predetermined time or longer.

A plurality of data lines and a plurality of gate lines may be arranged in the display panel 100, and intersect each other. The pixels P may be arranged in a matrix form in the display panel 100. A data voltage corresponding to the image data may be written to a pixel array of the display panel 100.

Each of the pixels P may be composed of a red sub-pixel, a green sub-pixel, and a blue sub-pixel for color rendering. Alternatively, the pixel may further include a white sub-pixel. A data line, a gate line, and a power line may be connected to each of the pixels P.

The source driver 200 may convert image data Da received from the timing controller 400 into a data voltage every frame, and then supplies the data voltage to the data lines in the default operation mode. The source driver 200 may include a digital-to-analog converter (DAC) which converts the image data Da into the data voltage.

In the low-speed operation mode, the source driver 200 may lower an operating frequency thereof under control of the timing controller 400. For example, the source driver 200 in the default operation mode may output the data voltage corresponding to the image data during every frame period. And the source driver 200 in the low-speed operation mode may output the data voltage in a partial period of every frame and stop the output of the data voltage during the remaining period of every frame. Therefore, the operating frequency and power consumption of the source driver 200 in the low-speed operation mode may be significantly lower than those in the default operation mode.

The gate driver 300 may output a scan signal under the control of the timing controller 400 to select pixels P to which the data voltage is charged. The gate driver 300 may be implemented as shift registers and shift the scan signal and sequentially supply the scan signals to the gate lines.

Further, the gate driver 300 may output an emission signal under the control of the timing controller 400 to control light-emitting timings of the pixels P charged with the data voltage. The gate driver 300 may include a shift register and an inverter and may shift an emission signal and sequentially supply the emission signals to the emission lines.

The gate driver 300 together with the pixel array may be formed directly on a substrate of the display panel 100 using a GIP (Gate-driver In Panel) process.

The timing controller 400 may include a low-speed operation control module that lowers an operating frequency of the panel driving circuit. The timing controller 400 may control the operation timing of the panel driving circuit 200 and 300 with a frame frequency obtained by multiplying a frame frequency by a positive integer in the default operation mode.

The timing controller 400 may lower the operating frequency of the panel driving circuit 200 and 300 in the low-speed operation mode. For example, the timing controller 400 may lower the operating frequency of the panel driving circuit 200 and 300 to 1 Hz so that a writing period of the image data Da to the pixels P is 1 second. The frequency in the low-speed operation mode is not limited to 1 Hz. In the low-speed operation mode, the pixels P of the display panel 100 may not be charged with new data voltage but maintain the already charged data voltage for a significant duration of one frame.

The timing controller 400 may generate a data timing control signal DCS for controlling an operation timing of the source driver 200 and a gate timing control signal SCS for controlling an operation timing of the gate driver 300, based on timing signals Vsync, Hsync, DE, and CLK received from a host system. Timing control signals which the timing controller 400 may generate in the default operation mode may be different from timing control signals which the timing controller 400 may generate in the low-speed operation mode.

In the low-speed operation mode, the timing controller 400 may control the panel driving circuit 200 and 300 to perform multiple refreshes in an initial period of a first frame and to change a refresh period to perform refresh after the multiple refreshes.

The timing controller 400 may continuously perform multiple refreshes at a first frequency a certain number of times during the initial period of the first frame, performs refresh at an interval of a first period after the initial period of the first frame, and perform refresh at an interval of a second period greater than the first period during a second frame.

In this regard, the first frequency may be set to 30 Hz. The first period may be set to a period corresponding to a second frequency of 10 Hz. The second period may be set to a period corresponding to a third frequency of 5 Hz.

For example, the timing controller 400 may continuously perform multiple refreshes at 30 Hz during the initial period of the first frame. After performing the multiple refresh, the timing controller 400 may perform refresh at an interval of a second period corresponding to the second frequency of 10 Hz during the remaining portion of the first frame. During the second frame, the timing controller may perform refresh at an interval of a third period corresponding to the third frequency of 5 Hz.

Then, the timing controller 400 may perform refresh at an interval of a fourth period corresponding to a fourth frequency of 2 Hz or lower during a third frame. In this way, the timing controller 400 may change a refresh period for each frame during a preset number of frames such that the refresh period increases over time.

Figure 2:
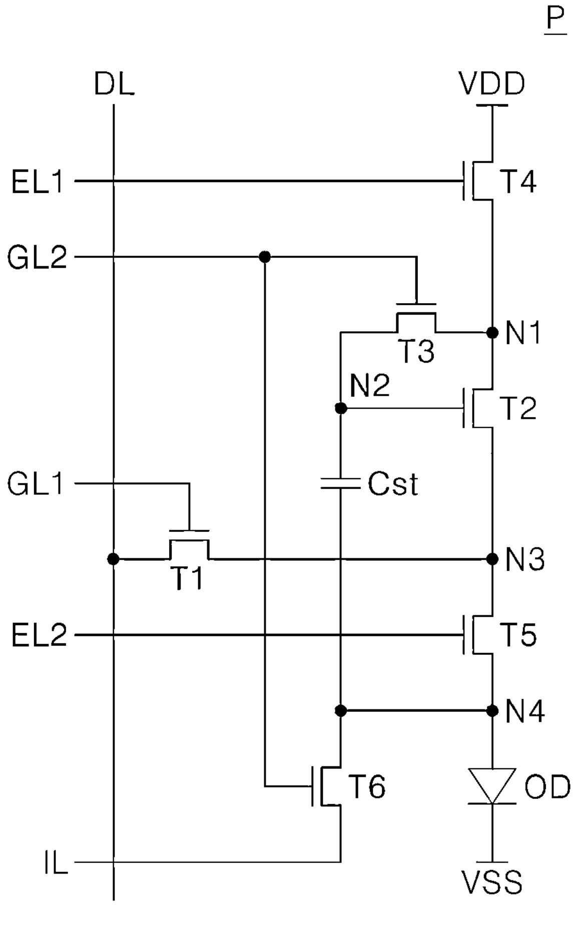
FIG. 2 is a circuit diagram showing an example of a pixel in a display apparatus according to an embodiment of the present disclosure.

FIG. 2 is a circuit diagram showing an example of a pixel in a display apparatus according to an embodiment of the present disclosure.

In FIG. 2, for convenience of illustration, a pixel composed of a 6TiC structure is shown as an example. Alternatively, a pixel having a structure such as 3T1C, 4T1C, 5T1C, 7T1C may be used.

Referring to FIG. 2, the pixel P may include a first switching transistor T1, a driving transistor T2, a second switching transistor T3, first and second light-emitting transistors T4 and T5, an initialization transistor T6, a storage capacitor Cst, and a light-emitting diode OD.

The first switching transistor T1 may be turned on in response to a first gate signal applied thereof through a first gate line GL1, and accordingly, the data voltage provided thereto through a data line DL may be applied to the driving transistor T2.

A source of the first switching transistor T1 may be connected to the data line DL, a gate thereof may be connected to the first gate line GL1, and a drain thereof may be connected to a source of the driving transistor T2, that is, a third node N3.

The driving transistor T2 may control a light-emission current applied to the light-emitting diode OD based on a gate-source voltage thereof. A gate of the driving transistor T2 may be connected to a second node N2, and a drain thereof is connected to a first node N1.

The initialization transistor T6 may be turned on in response to a second gate signal applied thereto through a second gate line GL2, and accordingly, an initialization voltage transmitted thereto through an initialization line IL may be applied to a fourth node N4. A gate of the initialization transistor T6 may be connected to the second gate line GL2, a source thereof may be connected to the initialization line IL, and a drain thereof may be connected to the fourth node N4.

The first light-emitting transistor T4 may control a current path between a first drive voltage VDD (or high potential drive voltage or power supply line) and the driving transistor T2 in response to a first light emission signal applied via a first light emission line EL1. A gate of the first light-emitting transistor T4 may be connected to the first light emission line EL1, a drain thereof may be connected to the power supply line, and a source thereof may be connected to a drain of the driving transistor T2, that is, the first node N1.

The second light-emitting transistor T5 may control a current path between the light-emitting diode OD and the driving transistor T2 in response to a second light emission signal applied thereto through a second light emission line EL2.

The light-emitting diode OD may emit light using the light-emission current supplied from the driving transistor T2. A first electrode (or an anode) of the light emitting diode OD may be connected to the fourth node N4, and a second electrode (or a cathode) thereof may receive a second drive voltage VSS (or a low potential drive voltage).

The second switching transistor T3 may be connected to and disposed between the gate and the drain of the driving transistor T2 in a diode connection manner. A gate of the second switching transistor T3 is connected to the second gate line GL2.

The storage capacitor Cst may be connected to and disposed between the second node N2 and the fourth node N4. The storage capacitor Cst may store and maintain a voltage applied to the gate of the driving transistor T2 and a threshold voltage until a next refresh period.

Each of switch transistors used as switch elements may have a larger off duration in the low-speed operation mode. Thus, in order to reduce off-current, that is, leakage current of each of the switch transistors in the low-speed operation mode, each of the switch transistors may be implemented as an oxide transistor including an oxide semiconductor material. When the switch transistor is implemented as the oxide transistor, the off-current may be reduced to prevent decrease in the charged voltage of the pixel P due to the leakage current.

Each of the driving transistor T2 used as a driving element and a switch transistor having a short off period may be embodied as a polycrystalline silicon transistor including a polycrystalline semiconductor material. Since the polycrystalline silicon transistor has high electron mobility, a current amount of the light-emitting diode OD may be increased to enhance the efficiency such that power consumption may be reduced.

Figure 3:
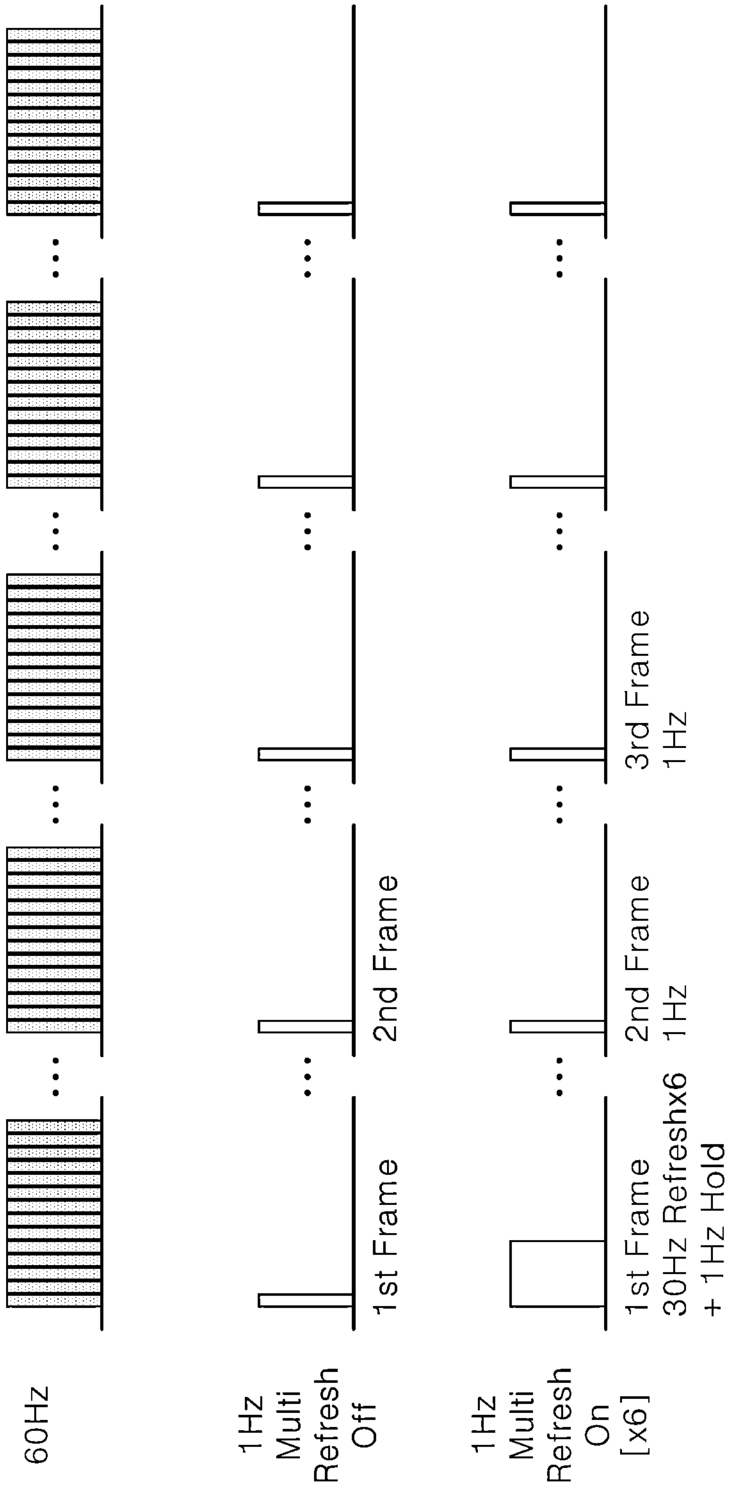
FIG. 3 is a timing diagram showing a method for operating a display apparatus according to a first embodiment of the present disclosure.
Figure 4:
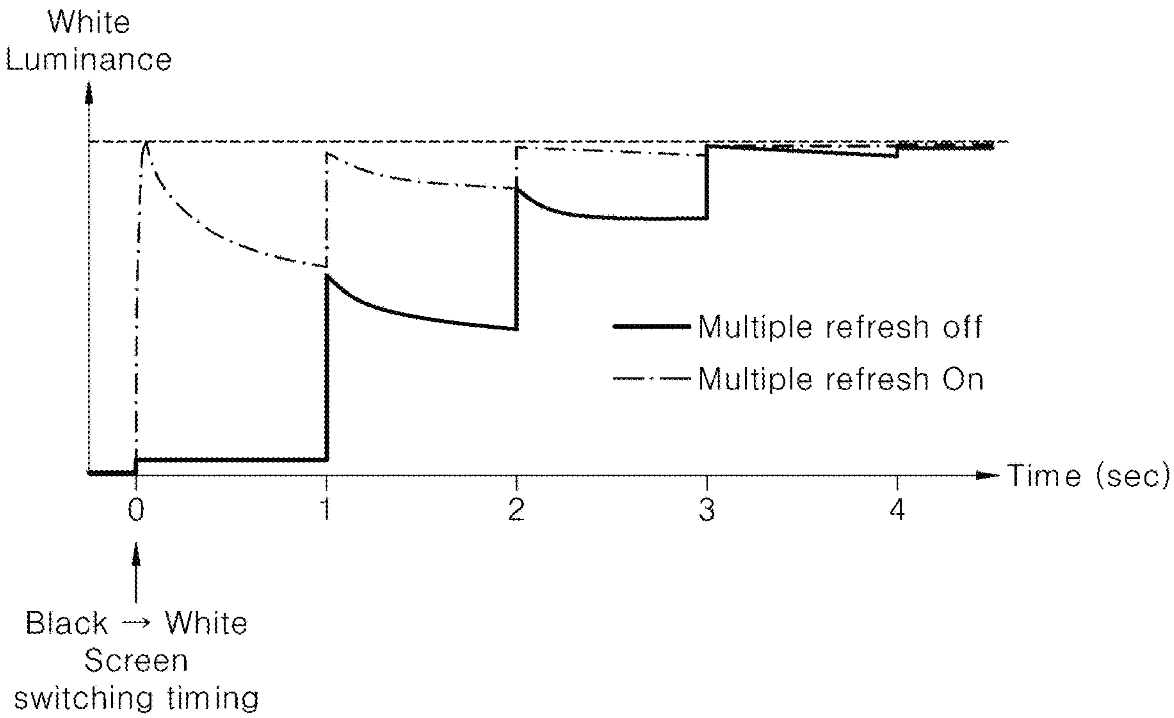
FIG. 4 is a graph showing luminance change over time in a low-speed operation of the display apparatus according to the first embodiment of the present disclosure.

FIG. 3 is a timing diagram showing a method for operating a display apparatus according to a first embodiment of the present disclosure. FIG. 4 is a graph showing luminance change over time in a low-speed operation of the display apparatus according to the first embodiment of the present disclosure.

With reference to FIGS. 3 and 4, the display apparatus 1000 may control the panel driving circuit 200 and 300 to perform multiple refreshes during the initial period of the first frame in low-speed operation mode.

The display apparatus 1000 may continuously perform multiple refreshes at a first frequency a predetermined number of times during the initial period of the first frame in the low-speed operation mode. In this regard, the first frequency may be set to 30 Hz, and the predetermined number of times may be set to 6 times.

For example, in the low-speed operation mode, the display apparatus 1000 may continuously perform refresh 6 times at a frequency of 30 Hz during the initial period of the first frame and then may maintain the frequency of 1 Hz.

Regarding the luminance change over time in the low-speed operation as shown in FIG. 4, it may be identified that response characteristic is improved in an operation of turning the multiple refresh on, compared to an operation of turning off the multiple refresh, at a time in which a screen switches from black to white.

In this way, the display apparatus 1000 may perform multiple refresh in order to reduce a response delay caused by hysteresis characteristic of the driving transistor of the pixel P in the low-speed operation of 1 Hz.

Figure 5:
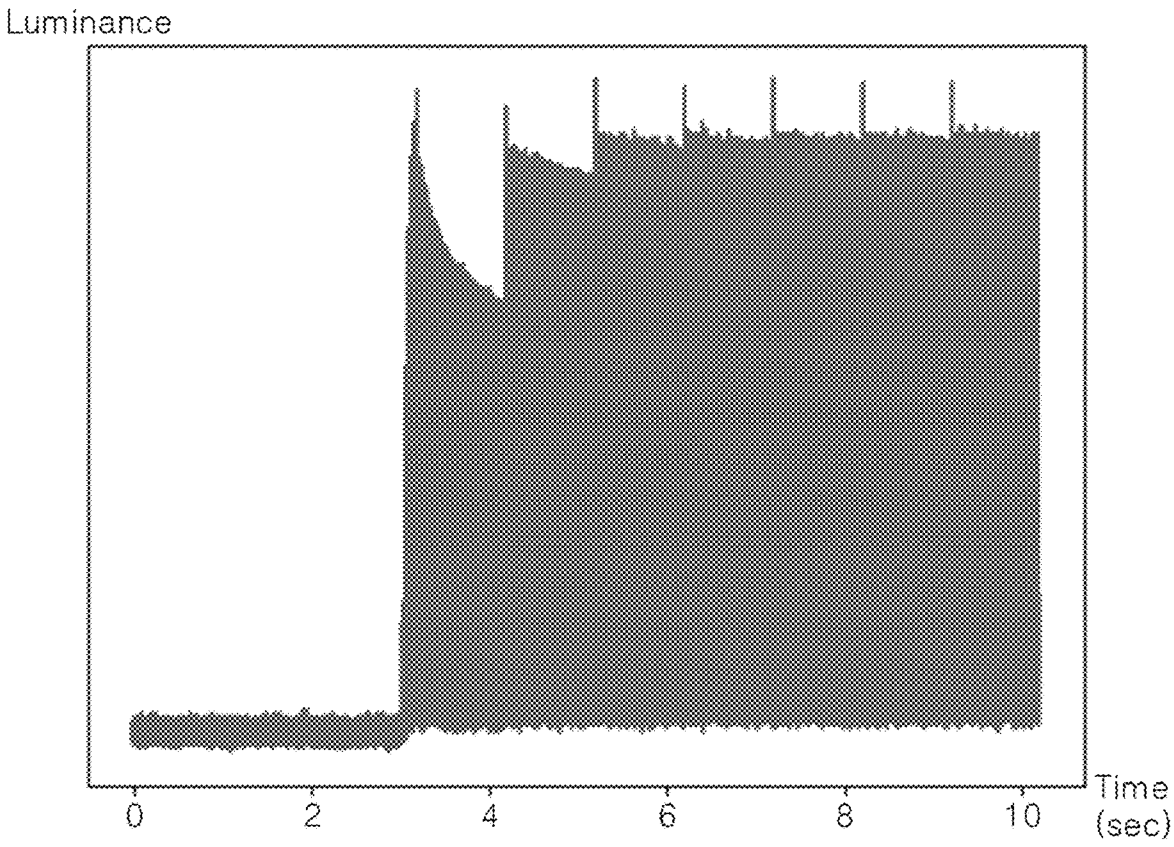
FIG. 5 is a graph showing actual product luminance change through a photo diode in the display apparatus according to the first embodiment of the present disclosure.
Figure 6:
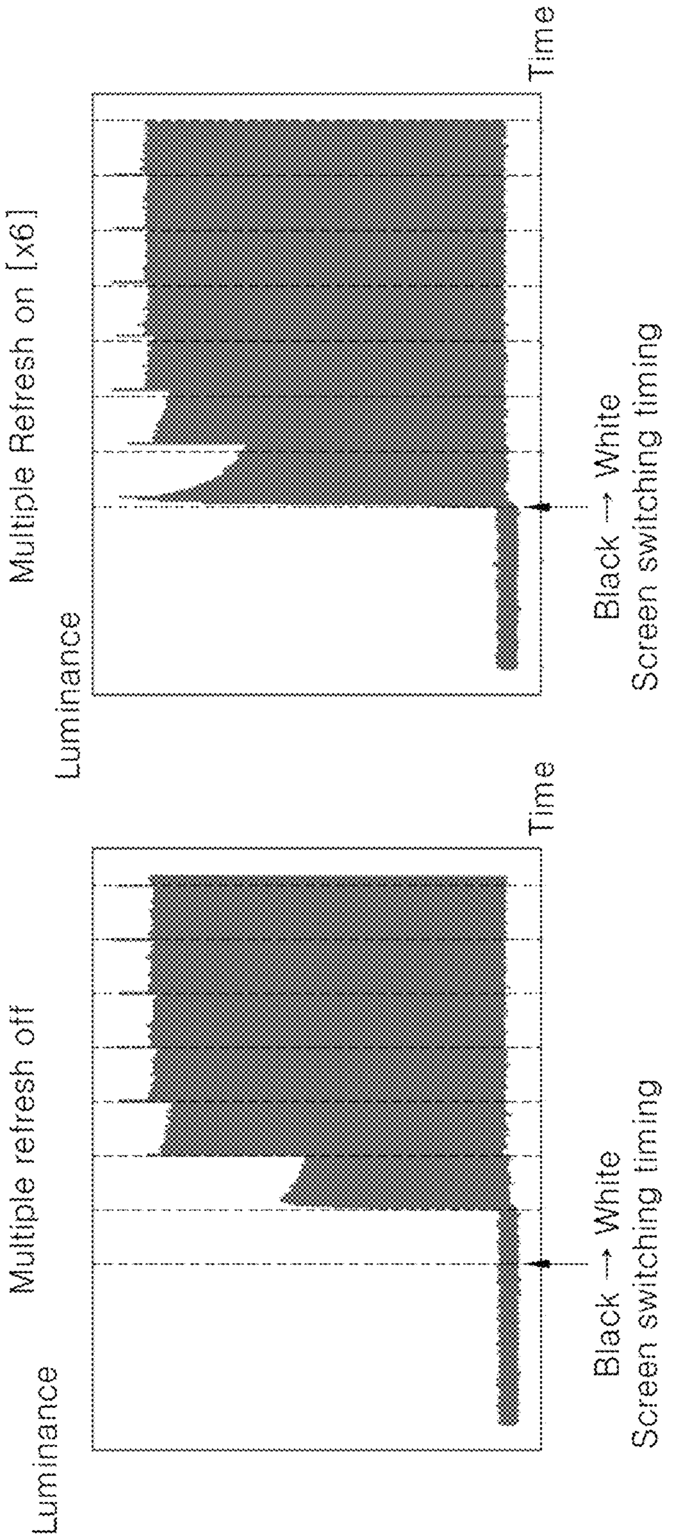
FIG. 6 is a graph showing response characteristics of the display apparatus according to the first embodiment of the present disclosure.

FIG. 5 is a graph showing luminance change of an actual product through a photo diode in the display apparatus according to a first embodiment of the present disclosure. FIG. 6 is a graph showing the response characteristics of the display apparatus according to a first embodiment of the present disclosure.

With reference to FIGS. 5 and 6, it may be identified that an average luminance level which is detected through the photo diode during the first frame is 80%. Moreover, it may be identified that continuous luminance change is detected after a refresh or sampling operation.

It may be identified that change in hysteresis characteristics of the driving transistor for 0.2 seconds may be compensated via an operation of a compensation circuit of the pixel as a sampling proceeds for initial 0.2 seconds via 6 refreshes at 30 Hz during the initial period of the first frame. However, it may be identified that after the 0.2 seconds, luminance decrease continuously occurs due to characteristic change of the driving transistor, and thus the response characteristic delay occurs.

A display apparatus and a method for operating the display apparatus according to a second embodiment of the present disclosure may change a refresh period to improve response characteristics in the low-speed operation mode.

Figure 7:
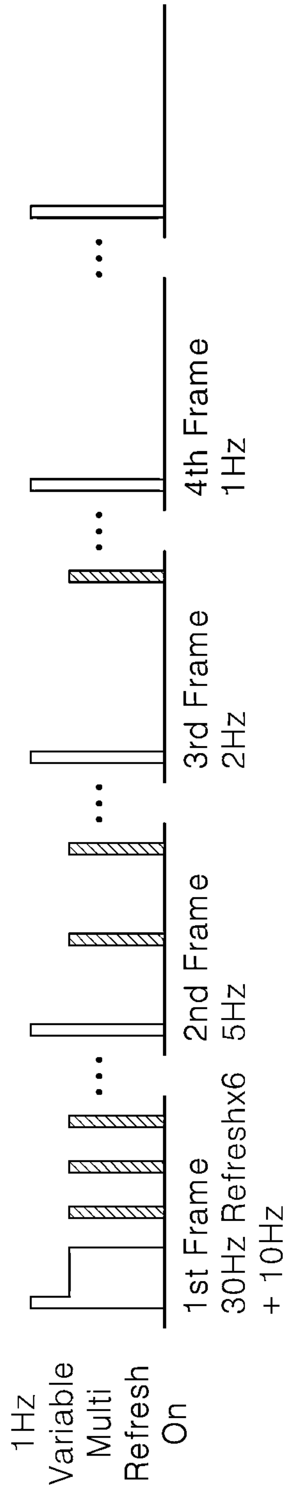
FIG. 7 is a timing diagram showing a method for operating a display apparatus according to a second embodiment of the present disclosure.
Figure 8:
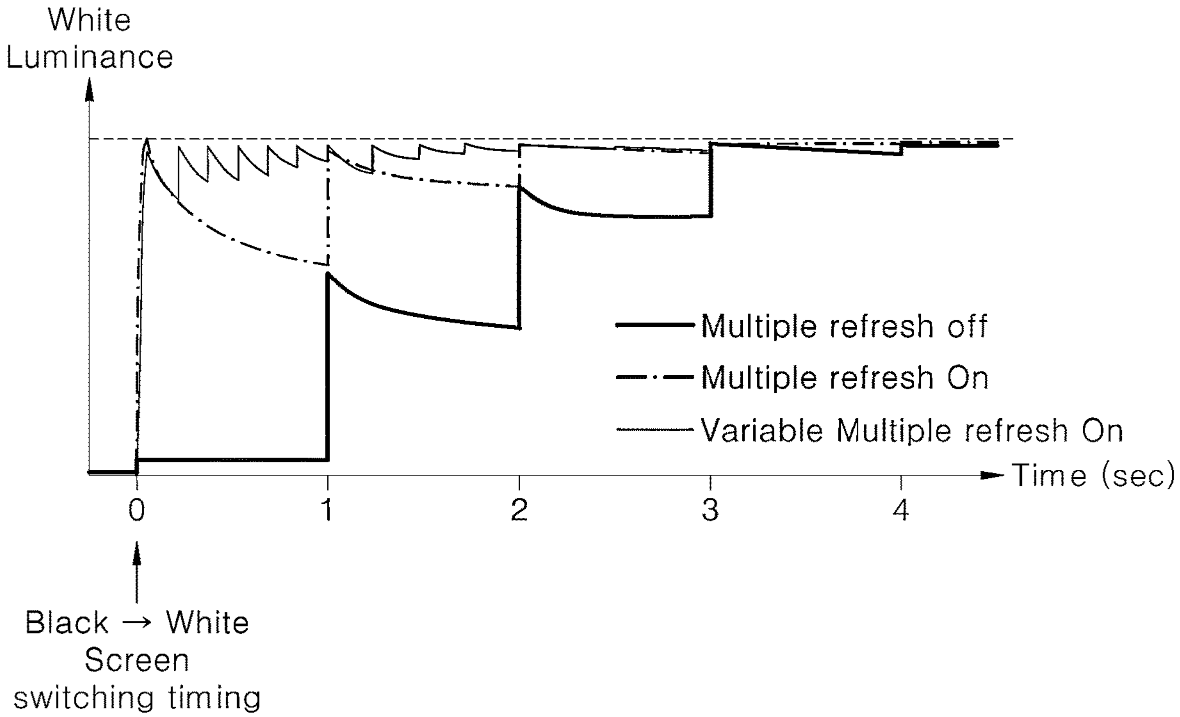
FIG. 8 is a graph showing response characteristics and luminance change over time in a low-speed operation of the display apparatus according to the second embodiment of the present disclosure.

FIG. 7 is a timing diagram showing the method for operating the display apparatus according to a second embodiment of the present disclosure. FIG. 8 is a graph showing response characteristics and luminance change over time in the low-speed operation mode of the display apparatus according to a second embodiment of the present disclosure.

With reference to FIGS. 7 and 8, the method for operating the display apparatus according to the second embodiment of the present disclosure may include changing the refresh period and performing refresh based on the changed refresh period in the low-speed operation mode.

The display apparatus 1000 may perform a refresh operation at a short refresh period in an initial frame with large initial hysteresis characteristic change, and gradually increase the refresh period for subsequent frames in which the hysteresis characteristic change gradually decreases, and perform a refresh operation based on the gradually increased refresh period for the subsequent frames, thereby improving the response characteristics.

In the low-speed operation mode, the display apparatus 1000 may control the panel driving circuit 200 and 300 to perform multiple refreshes during the initial period of the first frame, and after the multiple refreshes of the first frame, change the refresh period and perform refresh based on the changed refresh period.

The display apparatus 1000 may continuously perform multiple refreshes at a first frequency a certain number of times during the initial period of the first frame, perform refresh at an interval of a first period after the initial period of the first frame, and perform refresh at an interval of a second period greater than the first period during a second frame.

In this regard, the first frequency may be set to 30 Hz. The first period may be set to a period corresponding to a second frequency of 10 Hz. The second period may be set to a period corresponding to a third frequency of 5 Hz.

For example, the display apparatus 1000 may continuously perform multiple refreshes at 30 Hz during the initial period of the first frame. After performing the multiple refresh, the display apparatus 1000 may perform refresh at an interval of a second period corresponding to the second frequency of 10 Hz during the remaining portion of the first frame. During the second frame, the display apparatus 1000 may perform refresh at an interval of a third period corresponding to the third frequency of 5 Hz.

Then, the display apparatus 1000 may perform refresh at an interval of a fourth period corresponding to a fourth frequency of 2 Hz or lower during a third frame.

In this way, in the low-speed operation mode, the display apparatus 1000 may change the refresh period for each frame during a preset number of frames such that the refresh period increases over time.

When an operating frequency changes from 60 Hz to 1 Hz, the display apparatus 1000 may continuously perform multiple refreshes to minimize luminance change due to hysteresis fluctuations and gradually reduce a frequency that determines the refresh period.

The display apparatus 1000 may perform refresh operations at various refresh periods during the first frame. In one example, the display apparatus 1000 may perform multiple refreshes at 60 Hz, and may perform refresh n times at an interval of a first period, may perform refreshes m times at an interval of a second period, and may perform refreshes k times at an interval of a third period. In this regard, the first period is not limited to corresponding to 60 Hz, and may be set to corresponding to be greater than or smaller than 60 Hz. The second period may be larger than the first period, and the third period may be set to be larger than the second period.

In the low-speed operation mode, the display apparatus 1000 may improve response characteristics due to hysteresis characteristics of the driving transistor, for example, response characteristics, luminance change speed and delay when the screen changes from black to white.

The display apparatus according to an embodiment of the present disclosure may be described as follows:

The display apparatus 1000 according to an embodiment of the present disclosure may include the display panel 100 and the panel driving circuit 200 and 300 that drives the display panel 100. In the low-speed operation mode, the display apparatus 1000 may control the panel driving circuit 200 and 300 to perform multiple refreshes during an initial period of the first frame, and then change the refresh period after multiple refreshes and then performs refreshes based on the changed period.

According to some embodiments of the present disclosure, the display apparatus 1000 may change the refresh period for each frame after performing multiple refreshes.

According to some embodiments of the present disclosure, the display apparatus 1000 may change the refresh period for each frame during the preset number of frames.

According to some embodiments of the present disclosure, after performing multiple refreshes during the first frame, the display apparatus 1000 may perform refreshes at an interval of a first period, and then perform refreshes at an interval of a second period greater than the first period during the second frame.

According to some embodiments of the present disclosure, the display apparatus 1000 may perform refreshes at an interval of a third period greater than the second period during a third frame.

According to some embodiments of the present disclosure, after performing the multiple refreshes, the display apparatus 1000 may increase the refresh period as the frames progress.

According to some embodiments of the present disclosure, the display apparatus 1000 may continuously perform multiple refreshes at a first frequency a certain number of times during an initial period of the first frame, perform refreshes at an interval of a first period during the remaining period of the first frame, and then, during a second frame, perform refreshes at an interval of a second period larger than the first period.

In this regard, the first frequency may be set to 30 Hz, the first period may be set to a period corresponding to the second frequency 10 Hz, and the second period may be set to a period corresponding to the third frequency 5 Hz.

According to another embodiment of the present disclosure, a display apparatus 1000 may include the display panel 100, the source driver 200 for driving a data line of the display panel 100, a gate driver 300 for driving a gate line of the display panel 100, and the timing controller 400 that controls the source driver 200 and the gate driver 300 to perform multiple refreshes during an initial period of the first frame and change the refresh period after performing the multiple refreshes and performs refreshes based on the changed refresh period in a low-speed operation mode.

According to some embodiments of the present disclosure, the timing controller 400 may change the refresh period for each frame after performing the multiple refreshes.

According to some embodiments of the present disclosure, the timing controller 400 may change the refresh period for each frame during the preset number of frames.

According to some embodiments of the present disclosure, after performing the multiple refreshes during the first frame, the timing controller 400 may perform refreshes at an interval of a first period, and perform refreshes at an interval of a second period larger than the first period during a second frame.

According to some embodiments of the present disclosure, the timing controller 400 may perform refreshes at an interval of a third period greater than the second period during a third frame.

According to some embodiments of the present disclosure, after performing the multiple refreshes, the timing controller 400 may gradually increase the refresh period as the frames progress.

According to some embodiments of the present disclosure, the timing controller 400 may continuously perform multiple refreshes at a first frequency a certain number of times during an initial period of the first frame, and perform refreshes at an interval of a first period during the remaining period of the first frame, and during the second frame, perform refreshes at an interval of a second period greater than the first period.

According to another embodiment of the present disclosure, a method for operating a display apparatus may include steps of: under a low-speed operation mode, performing multiple refreshes during an initial period of a first frame; performing refresh at an interval of a first period during a remaining period of the first frame; and performing refresh at an interval of a second period greater than the first period during a second frame.

According to some embodiments of the present disclosure, the method may further comprise step of performing refresh at an interval of a third period greater than the second period during a third frame.

According to some embodiments of the present disclosure, the step of performing the multiple refreshes may include continuously perform refresh a predetermined number of times at a first frequency during the initial period of the first frame.

According to some embodiments of the present disclosure, when an operation mode of the display apparatus switches to the low-speed operation mode, an operating frequency of the display apparatus gradually may decrease.

According to an embodiment of the present disclosure, it is possible to change the refresh period to improve response characteristics in the low-speed operation mode.

Further, according to an embodiment of the present disclosure, it is possible to maintain a target level of image data charged to the pixels in the low-speed operation mode.

Further, according to an embodiment of the present disclosure, it is possible to operate at a short period even when change in operation characteristics due to element hysteresis occurs, thereby reducing the change amount such that change in luminance may be reduced and thus the target level may be maintained.

Further, according to an embodiment of the present disclosure, it is possible to improve response characteristics and maintain the target level, thereby improving image quality, under the low-speed operation mode.

Further, according to an embodiment of the present disclosure, it is possible to achieve the low-speed operation while maintaining the image quality, thereby reducing power consumption.

In the display apparatus according to the embodiments of the present disclosure, a subject that changes the refresh period in the low-speed operation is embodied as the timing controller 400. However, the subject is not limited thereto.

The display apparatus according to the embodiment of the present disclosure may include a refresh control module for changing the refresh period under the low-speed operation mode. Alternatively, the display apparatus may include a refresh control module that changes the refresh period in the low-speed operation in the source driver 200 or the gate driver 300.

It will be apparent to those skilled in the art that various modifications and variations can be made in the display apparatus and the method for operating the same of the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. A display apparatus, comprising:
a display panel; and
a panel driving circuit configured to drive the display panel,
wherein in a low-speed operation mode, the apparatus is configured to control the panel driving circuit to:
perform multiple refreshes during an initial period of a first frame; and
change a refresh period and perform refreshes based on the changed refresh period after the multiple refreshes, and
wherein the apparatus is configured to:
continuously perform the multiple refreshes with a predetermined number of times at a first frequency at the initial period of the first frame; and
perform refresh at a second frequency during a remaining period of the first frame.

2. The apparatus of claim 1, wherein the second frequency is set to a value smaller than the first frequency.

3. The apparatus of claim 1, wherein the apparatus is further configured to perform refresh at a third frequency smaller than the second frequency at a second frame.

4. The apparatus of claim 1, wherein in the low-speed operation mode of the display panel, an operating frequency of the apparatus gradually decreases as frames progress.

5. The apparatus of claim 1, wherein the apparatus is configured to:
continuously perform the multiple refreshes with a predetermined number of times at a first frequency at the initial period of the first frame;
perform refresh at an interval of a first period at a remaining period of the first frame; and
perform refresh at an interval of a second period at a second frame.

6. The apparatus of claim 5, wherein the first period is set to a value corresponding to a second frequency that is smaller than the first frequency.

7. The apparatus of claim 5, wherein the second period is set to a value greater than the first period.

8. A display apparatus, comprising:
a display panel; and
a panel driving circuit configured to drive the display panel,
wherein in a low-speed operation mode, the apparatus is configured to control the panel driving circuit to:
perform multiple refreshes during an initial period of a first frame; and
change a refresh period and perform refreshes based on the changed refresh period after the multiple refreshes, and
wherein the apparatus is configured to:
continuously perform the multiple refreshes with a predetermined number of times at a first frequency at the initial period of the first frame; and
perform refresh at an interval of a first period at a remaining period of the first frame.

9. The apparatus of claim 8, wherein the first period is set to a value corresponding to a second frequency that is smaller than the first frequency.

10. The apparatus of claim 8, wherein the apparatus is further configured to perform refresh m times at an interval of a second period at a second frame.

11. The apparatus of claim 10, wherein the second period is set to a value greater than the first period.

* * * * *